United States Patent
Oguz et al.

(10) Patent No.: US 12,455,340 B2
(45) Date of Patent: Oct. 28, 2025

(54) METHOD FOR LOCATING AN ELECTRONIC DEVICE, CORRESPONDING SYSTEM AND CORRESPONDING ELECTRONIC DEVICE

(71) Applicant: VALEO COMFORT AND DRIVING ASSISTANCE, Créteil (FR)

(72) Inventors: Onur Oguz, Créteil (FR); Yves Richard, Créteil (FR); Eric Menard, Créteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 661 days.

(21) Appl. No.: 17/783,482

(22) PCT Filed: Dec. 2, 2020

(86) PCT No.: PCT/EP2020/084331
§ 371 (c)(1),
(2) Date: Jun. 8, 2022

(87) PCT Pub. No.: WO2021/115885
PCT Pub. Date: Jun. 17, 2021

(65) Prior Publication Data
US 2023/0018938 A1 Jan. 19, 2023

(30) Foreign Application Priority Data

Dec. 9, 2019 (EP) .................................... 19214562

(51) Int. Cl.
*G01S 5/00* (2006.01)
*G01S 5/02* (2010.01)
(Continued)

(52) U.S. Cl.
CPC ..................................... *G01S 5/06* (2013.01)

(58) Field of Classification Search
CPC .... G01S 13/765; G01S 13/876; G01S 5/0036; G01S 5/0205; G01S 5/06; H04W 4/023; H04W 64/006
See application file for complete search history.

(56) References Cited

U.S. PATENT DOCUMENTS

| 10,559,149 B1 * | 2/2020 | Kuechler ........... G07C 9/00309 |
| 2010/0304690 A1 * | 12/2010 | Proefke ................... B60R 25/24 340/5.2 |

(Continued)

FOREIGN PATENT DOCUMENTS

| CA | 3001247 A1 * | 4/2017 | ........... B60R 25/245 |
| GB | 2551861 A * | 1/2018 | ........... B60R 25/245 |

OTHER PUBLICATIONS

International Search Report and Written Opinion in corresponding International Application No. PCT/EP2020/084331, dated Feb. 2, 2021 (10 pages).

*Primary Examiner* — Joseph E Dean, Jr.
(74) *Attorney, Agent, or Firm* — Osha Bergman Watanabe & Burton LLP

(57) ABSTRACT

A method is described for locating an electronic device in the vicinity of an array having a central unit and anchors connected to the central unit. The method is applied during at least a communication cycle comprising a plurality of time slots each allocated to a distinct anchor. The method involves receiving an initiation signal from the electronic device, performing an election of a set of anchor(s) based on the reception quality of the initiation signal, emitting a reply signal during a respective allocated time slot, operating the electronic device in a first configuration during the time slots which are not allocated to one of the anchors the elected set, operating the electronic device in a second configuration during the time slot allocated to the elected set to detect and (Continued)

receive a reply signal, and calculating a location of the electronic device based on the reply signal.

16 Claims, 5 Drawing Sheets

(51) Int. Cl.
*G01S 5/06* (2006.01)
*G01S 13/76* (2006.01)
*G01S 13/87* (2006.01)
*H04W 4/02* (2018.01)
*H04W 64/00* (2009.01)

(56) References Cited

U.S. PATENT DOCUMENTS

| | | | |
|---|---|---|---|
| 2014/0253287 A1* | 9/2014 | Bauman | G07C 9/00309 |
| | | | 340/5.61 |
| 2015/0028995 A1* | 1/2015 | Gautama | G06F 1/3215 |
| | | | 340/5.72 |
| 2017/0103594 A1* | 4/2017 | Kim | G07C 9/00309 |
| 2020/0307555 A1* | 10/2020 | Van Wiemeersch | B60W 30/06 |
| 2020/0339066 A1* | 10/2020 | Park | B60R 25/245 |
| 2022/0169206 A1* | 6/2022 | Moeller | G06F 8/65 |
| 2022/0186533 A1* | 6/2022 | Prince | G07C 9/00174 |
| 2022/0191733 A1* | 6/2022 | Ali | H04L 41/0895 |

\* cited by examiner

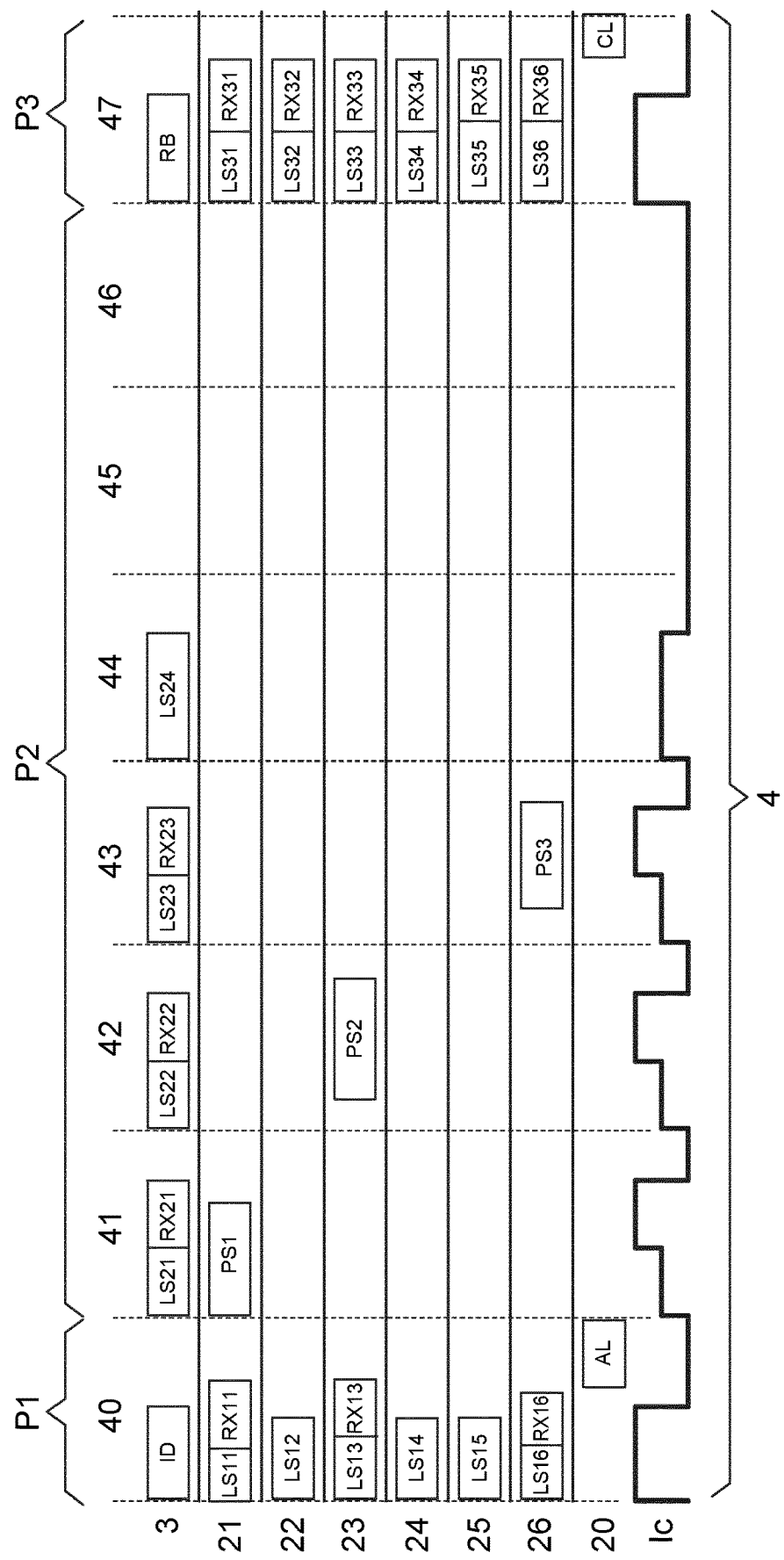

METHOD FOR LOCATING AN ELECTRONIC DEVICE, CORRESPONDING SYSTEM AND CORRESPONDING ELECTRONIC DEVICE

TECHNICAL FIELD OF THE INVENTION

The invention relates to the domains of wireless communication and mobile electronic device, notably to the domain of the radiolocating systems.

More precisely the invention relates to a method for locating an electronic device and to a corresponding system, a corresponding array and a corresponding electronic device.

BACKGROUND INFORMATION AND PRIOR ART

Some automotive vehicles may comprise a wireless system that allows a user in possession of a wireless electronic device, for instance a key, a key fob, a card or a mobile phone, to access or start the vehicle by holding say wireless electronic device in the vicinity of the vehicle. For instance, such a system may unlock a specific door of the vehicle or start the vehicle depending on the location of the user holding the wireless electronic device. Several solutions exist to locate a wireless electronic device.

A well-known solution comprises the use of an array comprising a central unit connected to several anchors arranged at several positions in or on a vehicle, and configured to establish a wireless communication with the wireless device.

As the wireless device is in the range of at least one anchor, it broadcasts a signal in order to notify its presence. Upon receiving this signal from the wireless electronic device, the central unit initiates a data exchange in which the anchors successively transmit signals to the wireless electronic device.

The wireless electronic device then listens, processes and responds to each of these signals in order for the central unit to determine its location. For instance, the locating could be performed according to well-known methods as the Time-of-Flight method or the RSSI method (Received Signal Strength Indicator).

However, depending on the arrangement of the anchors and/or the position of the wireless electronic device, it is possible that some anchors are not able to establish a connection with the wireless electronic device. Therefore, the wireless electronic device may listen in vain for a response from the anchor. As the listening generates a high current consumption and as the wireless electronic device operates on battery, this may be very inconvenient.

SUMMARY OF THE INVENTION

Therefore, an object of the invention is to provide an energy efficient wireless communication method and system for locating a wireless electronic device.

The above objects are achieved thanks to the invention by providing a method for locating an electronic device in the vicinity of an array comprising a central unit and a plurality of anchors connected to the central unit, the electronic device comprising a receiving circuit and having a first configuration in which the receiving circuit is deactivated and a second configuration in which the receiving circuit is configured to detect and receive signals, said method comprising the following steps applied during at least a communication cycle comprising a plurality of time slots each allocated to a distinct anchor:—

- receiving, by at least one of the anchors, of an initiation signal from the electronic device,
- performing an election of a set of at least one anchor among the plurality of anchors based on the reception quality of the initiation signal,
- emitting via the elected set of at least one anchor a reply signal during their respective allocated time slot,
- operating the electronic device in the first configuration during the one or several time slots of the communication cycle which are not allocated to one of the anchors belonging to the elected set of at least one anchor,
- operating the electronic device in the second configuration during the at least one time slot allocated to the elected set of at least one anchor in order to detect and receive a reply signal, a calculation of a location of the electronic device based on the reply signal received by the electronic device.

Therefore, thanks to the invention, since the receiving circuit is deactivated during at least a time slot, a very low current is consumed by the electronic device during some of the time slots and the autonomy of the electronic device is thus increased. Moreover, since only some of the reply signals are required to locate the electronic device, the method according to the invention does not lead to a drop in the accuracy of the locating.

An election based on the quality of the initiation signal is very advantageous because it ensures that only the anchors which can establish the best communication with the electronic device will take part to the locating method. Therefore, the accuracy of the method is increased.

According to an embodiment, the method comprises an election of some of the time slots of the plurality of time slots and, during the earliest time slot of the plurality of time slots,

- an operation of the electronic device in the second configuration,
- a first emission by a first anchor, of a first reply signal comprising a time slots map comprising information on which time slots are elected,
- an operation of the electronic device into the first configuration during the non-elected time slots according to the time slots map and
- an operation of the electronic device into the second configuration during the elected time slots according to the time slots map.

Therefore, it is possible to better distribute current consumption during the communication cycle. This is notably advantageous when the power supply of the electronic device comprises a decoupling capacitor which has therefore more time to reload between the emissions. Consequently, a smaller capacitor may be used, reducing the size and cost of the electronic device, and the method may comprise more time slots, that is to say the array may comprise more anchors.

According to an embodiment, the emissions comprise a last emission, by a last anchor, of a last reply signal comprising a deactivation command, the method comprising an operation of the electronic device into the first configuration at the detection of the deactivation command.

Since the deactivation command is sent during the last emission, the array advantageously has more time to create a payload corresponding to the deactivation command.

According to an embodiment, the method may comprise an operation of the electronic device in the first configuration if, after a predetermined time period during a time slot, no reply signal is detected by the electronic device in the second configuration.

This advantageously simplify the method since no payload corresponding to a deactivation command needs to be created.

The method may comprise a plurality of communication cycles.

Several communication cycles may be useful to follow the possible movements of the electronic device, or to increase the accuracy of the locating by combining the results obtained during each cycle.

According to another aspect, it is provided a system comprising an electronic device and an array comprising a central unit and a plurality of anchors electrically coupled to the central unit, the electronic device comprising a receiving circuit and having a first configuration in which the receiving circuit is deactivated and a second configuration in which the receiving circuit is configured to detect and receive signals, the array being configured to locate the electronic device during a communication cycle comprising a plurality of time slots each being allocated to an anchor, wherein the central unit is configured to perform an election of set of at least one anchor among the plurality of anchors based on the reception quality of an initiation signal received from the electronic device by at least one of the anchors, control emissions via the anchors belonging to the elected set of at least one anchor during their respective time slots, of respective reply signals, the electronic device is configured to operate in the first configuration during the one or several time slots of the communication cycle which are not allocated to one of anchors belonging to the elected set of at least one anchor, and to operate in the second configuration during the at least one time slot allocated to the elected set of at least one anchor in order to detect and receive a reply signal, the system being configured to calculate a location of the electronic device based on the at least one reply signal received by the electronic device.

According to an embodiment, the array is configured to elect some of the time slots of the plurality of time slots and, the electronic device is configured to be in the second configuration during the earliest time slot of the plurality of time slots, the array is configured to perform a first emission, via a first anchor, of a first reply signal comprising a time slots map comprising information on which time slots are elected, the electronic device is configured to operate in the first configuration during the non-elected time slots and to operate in the second configuration during the elected time slots according to the time slot map.

According to an embodiment, the array is configured to perform a last emission, by a last anchor, of a last reply signal comprising a deactivation command, the electronic device being configured to operate in the first configuration at the detection of the deactivation command.

According to an embodiment, the electronic device is configured to operate in the first configuration if, after a predetermined time period during a time slot, no reply signal is detected by the electronic device operating in the second configuration.

According to another aspect of the invention, it is provided an array comprising a central unit and a plurality of anchor electrically coupled to the central unit, the array being suitable for locating an electronic device during a communication cycle comprising a plurality of time slots each being allocated to an anchor, the array being configured to emit, via at least some of the anchors during their respective time slots, respective reply signals, the array being configured to calculate a location of the electronic device based on the at least one reply signal received by the electronic device.

According to an embodiment, the array is configured
to perform an election of some of the time slots of the plurality of time slots and wherein,
to perform a first emission, via a first anchor, of a first reply signal comprising a time slots map comprising information on which time slots are elected, According to an embodiment, the array is configured to
to perform a reception, by at least some of the anchors, of an initiation signal from the electronic device,
to perform a preliminary election of some of the anchors based on the quality of the reception of the initiation signal by the anchors,
to perform the election of the time slots allocated to the elected anchors.

According to an embodiment, the array is configured to perform a last emission, by a last anchor, of a last reply signal comprising a deactivation command, the electronic device being configured to operate in the first configuration at the detection of the deactivation command.

The array may be arranged on an automotive vehicle.

According to another aspect, it is provided an electronic device comprising a receiving circuit and having a first configuration in which the receiving circuit is deactivated and a second configuration in which the receiving circuit is configured to detect and receive signals, configured to cooperate with and to be located by an array comprising a central unit and a plurality of anchors electrically coupled to the central unit during a communication cycle comprising a plurality of time slots each being allocated to an anchor, the central unit being configured to perform an election of a set of at least one anchor among said plurality of anchors based on the reception quality of an initiation signal received by at least one of the anchors and to control emissions via the elected set of at least one anchor during their respective time slots of respective reply signals, said electronic device being further configured to operate in the first configuration during the one or several time slots of the communication cycle which are not allocated to one of anchors belonging to the elected set of at least one anchor, and to operate in the second configuration during the at least one time slot allocated to the elected set of at least one anchor in order to detect and receive a reply signal.

According to an embodiment, the electronic device is configured
to operate in the second configuration during the earliest time slot of the plurality of time slots,
to perform a first reception of a first reply signal comprising a time slots map comprising information regarding an election of some of the time slots by the array,
to operate in the first configuration during the non-elected time slots and to operate in the first configuration during the elected time slots, according to the time slots map.

According to an embodiment, the electronic device is configured to operate in the first configuration at the detection of a deactivation command.

According to an embodiment, the electronic device is configured to operate in the first configuration if, after a predetermined time period operating in the second configuration during a time slot, no reply signal is detected.

DETAILED DESCRIPTION OF EXAMPLE(S)

Other advantages and features of the invention will appear in the following detailed description of particular embodiments of the invention and on the accompanying drawings. It should be noted that the invention is not limited to the particular embodiments illustrated in the drawings; accordingly, it should be understood that where features mentioned in the claims are followed by reference signs, such signs are included solely for the purpose of enhancing the intelligibility of the claims and are in no way limiting on the scope of the claims.

In the accompanying drawings:

FIG. 5 is a chronogram illustrating a method according to a third embodiment of the invention.

Figure 1:
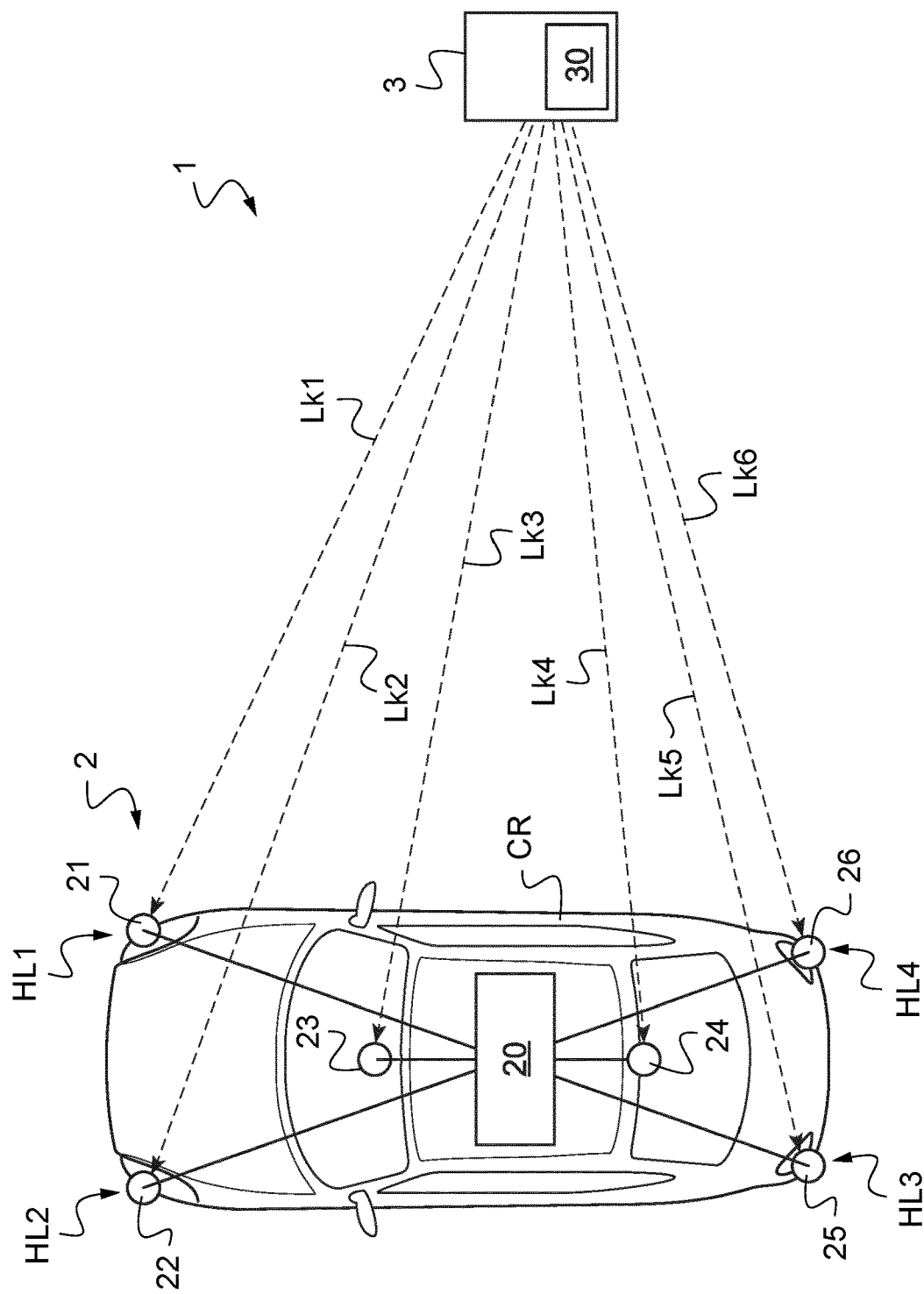
FIG. 1 is a schematic view of a system according to an embodiment of the invention.

A system 1 according to an embodiment of the invention is shown in FIG. 1. The system comprises an array 2 and an electronic device 3, the system being configured to perform distance measurements between the array and the electronic device and to locate the electronic device 3.

In this particular embodiment, the array 2 is arranged on an automotive vehicle CR, for instance here a car, and the electronic device 3 is an electronic key of the vehicle, or key fob. However, this example is not at all limiting and the array may be arranged anywhere, such as in or on another type of vehicle, in a room, outside, etc. and the electronic device may be of any kind, for instance a smartphone, an electronic watch, or a tag having no other function than that of being located.

The array 2 comprises a central unit 20, for instance a computer or an electronic circuit comprising a microcontroller, and a plurality of anchors 21 to 26, that is to say a programmable transceiver unit, configured to communicate with the central unit 20.

In this embodiment, a first anchor 21 and a second anchor 22 are respectively arranged near a front right headlight HL1 and a front left headlight HL2 of the car CR, a third anchor 23 is arranged in a front part of the interior of the car CR, for instance between the driver seat and the front passenger seat, a fourth anchor 24 is arranged in a rear part of the interior of the car CR, and a fifth anchor 25 and a sixth anchor 26 are respectively arranged near a left rear headlight HL3 and a right rear headlight HL4 of a car.

For instance, here, the anchors 21 to 26 are directly and electrically connected to the central unit 20 so as to be able to communicate with the central unit. For instance, the anchors are connected to the central unit via CAN (Controller Area Network) buses or LIN (Local Interconnect Network) buses.

The array 2 is configured to emit and receive radio signals via its anchors 21 to 26.

The electronic device 3 is a battery-operated device comprising an electronic receiving circuit 30, for instance here an integrated circuit comprising an antenna, and is configured to emit and receive radio signals. More specifically, the electronic device 3 is configured to establish individual (here short-range) communication links Lk1 to Lk6 with the array 2 respectively via the anchors 21 to 26, that is to say communication links at a distance inferior to 100 meters. The electronic device is either in a first configuration in which the receiving circuit 30 is deactivated or in a second configuration in which the receiving circuit 30 is configured to detect and receive signals The array 2 and the device 3 are configured to communicate according to the Ultra Wide Band Technology (UWB technology), which comprise communications with signals having a very low power spectral density over bandwidth broader than 500 MHz. The UWB technology is suitable for short range communications and is advantageous because it does not interfere with conventional transmission technologies.

Figure 2:
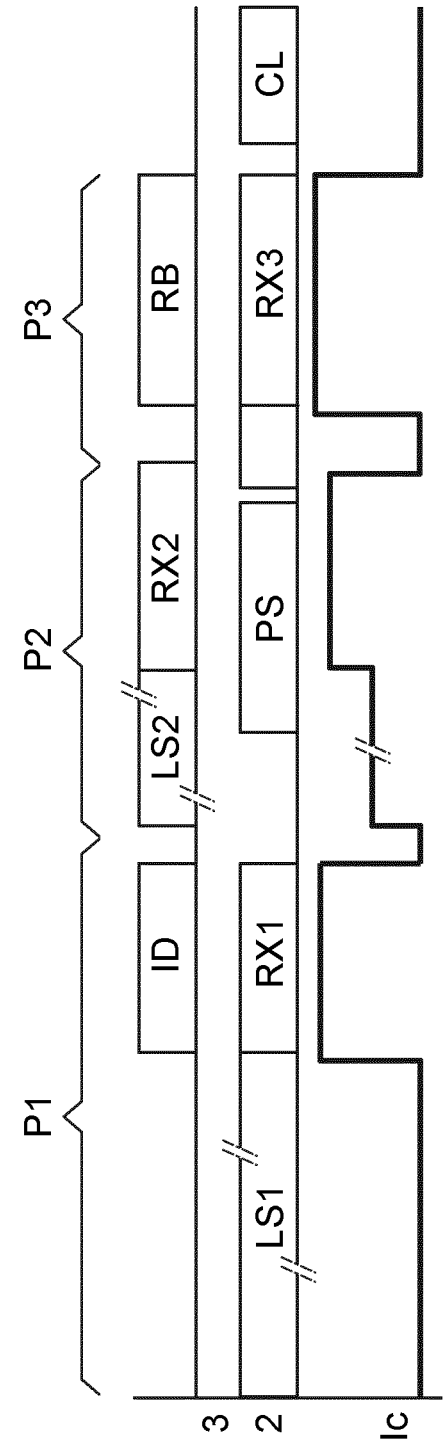
FIG. 2 is a chronogram illustrating a communication between one anchor and an electronic device.

FIG. 2 is a chronogram schematically illustrating an elementary communication between the electronic device 3 and the array 2, that is, a communication between the electronic device 3 and only one of the anchors, and the current consumption Ic of the electronic device 3 during this elementary communication. This elementary communication may be part of a communication cycle involving a plurality of elementary communications between the anchors and the electronic device 3, as it will be described below.

Initially, during an initiation phase P1 the electronic device 3 initiates the communication by broadcasting an initiation signal, or initiation frame.

The anchors performs initially an initiation listening LS1 in which it waits for a detection of the initiation signal and, after having detected the initiation signal, it performs an initiation reception Rx1 of the initiation signal. The duration of the initiation listening LS1 may be variable and is limited to a first predetermined time period after which the antenna stops listening. For example, the first predetermined time period is equal to 1 millisecond. During the initiation phase P1, the electronic device 3 consumes a current of 110 milliamperes.

Then, during a reply phase P2, the electronic device 3, which is in the second configuration, performs a reply listening LS2 in order to detect a reply signal from the anchor. For example, the electronic device 3 may be configured to detect a header frame of the reply signal. The duration of the reply listening LS2 may be variable and is limited to a second predetermined time period after which the electronic device stops listening. For example, the predetermined time period is equal to 60 microsecond.

During the reply phase P2, the anchor proceeds to an emission PS of a reply signal to the electronic device 3 in order to facilitate distance measurement. This reply signal contains, among others, time synchronization information that allows the antenna and the electronic device 3 to temporally synchronize, Upon detection of the reply signal, the electronic device 3 performs a reply reception RX2 in order to process the reply signal.

The current consumed by the electronic device during the reply phase P2 is equal to 80 milliamperes during the reply listening, and 110 milliamperes during the reply reception. This current is mainly consumed by the receiving circuit 30.

It should be noted that when the reply detection is not successful, the receiving circuit consume a current of 80 milliamperes during the predetermined period of 60 microseconds. This current consumption is therefore lost.

During a final phase P3, which is a last phase of the communication between the array and the electronic device, the electronic device 3 proceeds to a final broadcast RB during which it broadcasts a final signal to the array 2, said final signal finalizes the communication cycle and it comprises time information about when the reply signal has been received by the electronic device 3.

The array 2, via the anchor, performs a final receiving RX3 of said final signal. Based on the time information contained in the final signal, the anchor performs a calculation CL to determine the distance between itself and the electronic device 3, for instance by using conventional time of flight technics.

In alternative, the electronic device may be configured to perform the calculation CL and to send the result in the final signal during the final broadcast RB.

The current consumed by the electronic device in the second configuration during the final phase P3 is equal to 110 milliamperes.

Figure 3:
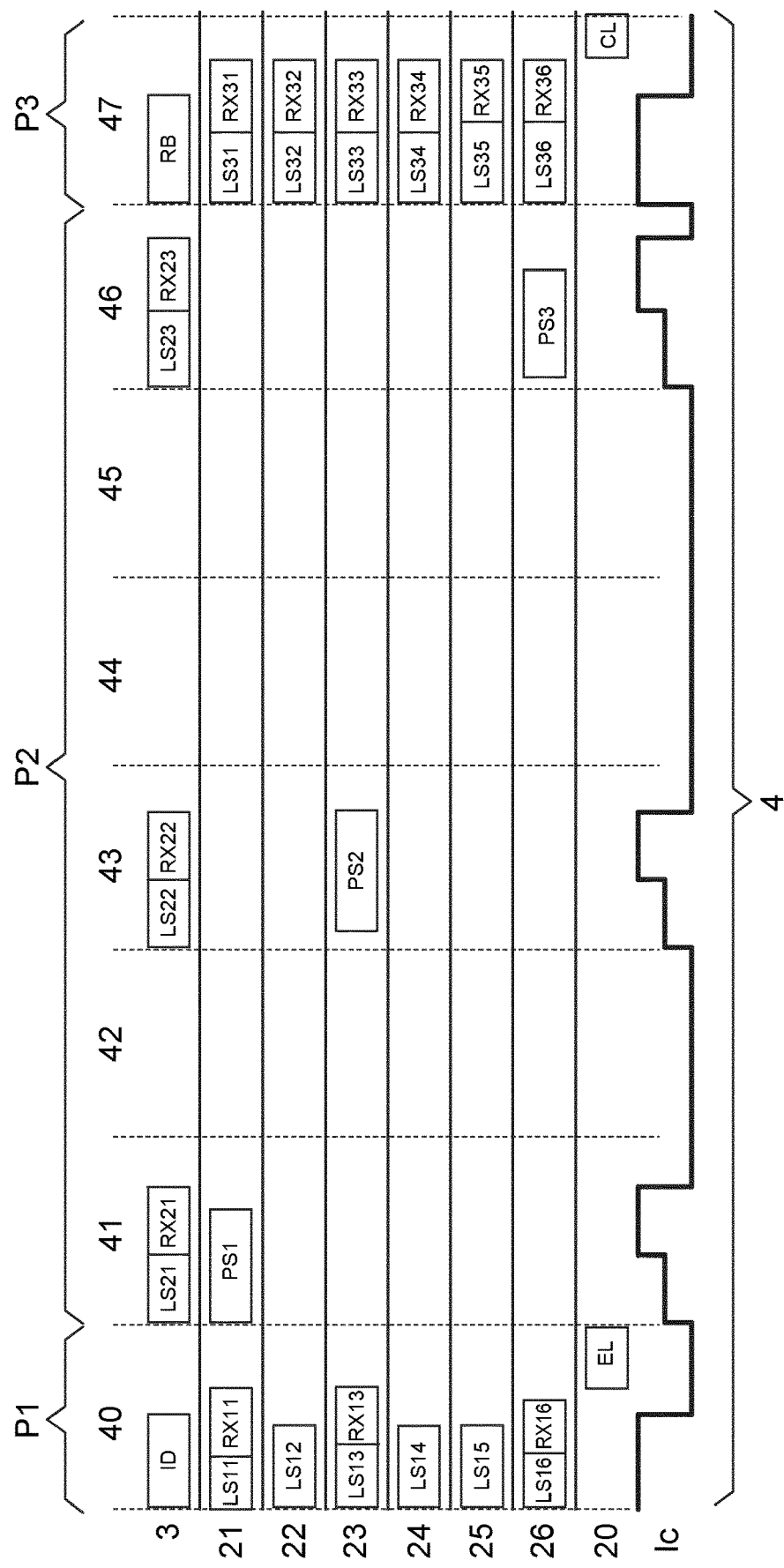
FIG. 3 is a chronogram illustrating a method according to an embodiment of the invention.

FIG. 3 illustrates an embodiment of the method according to the invention by showing a chronogram of a communication cycle 4 between the array 2 and the electronic device 3, at the end of which a position of the electronic device 3 is determined by the central unit 20. Although only one communication cycle 4 is shown on FIG. 3, the method according to the invention may comprise several successive cycles. FIG. 3 also illustrate the current consumption Ic of the electronic device 3 during this communication cycle 4.

The communication cycle 4 is divided into several time slots and the initiation phase P1 comprises a first time slot 40, the reply phase P2 comprises a second time slot 41, a third time slot 42, a fourth time slot 43, a fifth time slot 44, a sixth time slot 45, a seventh time slot 46 and the final phase P3 comprises an eighth time slot 46.

In this embodiment, the initiation phase P1, the reply phase P2 and the final phase P3 are common to all the anchors.

Here, all the time slots have the same duration, here a duration of 1.175 milliseconds, but in alternative the times slots may have different durations.

Each time slots of the reply phase is allocated to a distinct anchor. For instance, here, the second, third, fourth, fifth, sixth and seventh time slot are pre-allocated respectively to the first, second, third, fourth, fifth and sixth anchors. This allocation is a default allocation, and the central unit is configured to change this allocation if needed.

During the initiation phase P1, the electronic device 3 proceeds to the initiation signal in order initiate the communication cycle 4.

The anchors 21 to 26 perform several initiation listenings, respectively LS11 to LS16, during which each anchor is configured to wait for a detection of the initiation signal. Then, when an anchor detects the initiation signal, it proceeds to an initiation reception in which said initiation signal is received by the anchor and processed. At the end of the initiation phase, each anchor transmits a reception status of its respective initiation reception to the central unit 20, that is to say an information about the success or failure of its respective initiation reception.

Each anchor is configured to stop the initiation listening after the first predetermined time period if the initiation signal is not received. For instance, on FIG. 3, the second anchor 22, the fourth anchor 24 and the fifth anchor 25 have not received the initiation signal and their respective initiation listening LS12, LS14 and LS15 are interrupted after the first predetermined time period. Therefore, they do not perform the initiation receptions, and in this example only the first anchor 21, the third anchor 23 and the sixth anchor 26 perform the initiation receptions respectively RX11, RX13 and RX16.

Depending on the anchor, the initiation listening may be longer or shorter. This difference may be caused by the configuration of the environment of the array 2, particularly by obstacle placed between the electronic device 3 and the anchors, for instance here people, such as passerby or passengers of the car CR.

Then, the central unit 20 proceeds to an election EL of some of the time slots, for instance in this embodiment three elected time slots, here the second time slot 41, the fourth time slot 43, and the seventh time slot 46, during which the electronic device 3 will operate in the second configuration.

In this embodiment, in order to elect the three time slots, the central unit proceed to a preliminary election of some of the anchors, for instance here the three preliminary elected anchors 21, 23 and 26 and elects the times slot allocated to these preliminary elected anchors. In this embodiment, the preliminary election is based on the reception status of the initiation receptions. Because the second, fourth and fifth anchors 22, 24 and 25 did not receive the initiation signal, they are not preliminary elected. It would be possible that the central unit 20 preliminary elects only some of the anchors which receive the initiation signal, for instance based on the power of the received signal. The central unit may also fund the preliminary election on a random selection among the anchors having received the initiation signal, or on a random selection among all the anchors.

Although the central unit 20 may choose any number of preliminary elected antennas, a number of at least two antennas is preliminary elected in order to ensure a locating of the electronic device 3, and more preferably a number of at least four antennas to improve the precision of the locating.

In order to perform a locating of the electronic device 3, the central unit 20 establishes a time slots map comprising information on which time slots are elected and which time slots are not elected.

Then, during the earliest time slot of the reply phase P2, here during the second time slot 41, the electronic 3 device operate in the second configuration and the first anchor 21 performs a first emission PS1 of a first reply signal to the electronic device 3, said first reply signal comprising the slot map, and the electronic device 3 performs a first reply listening LS21 during which it waits for a detection of the first reply signal from the first anchor 21. Upon detection of the first reply signal, the electronic device 3 performs a first reply reception Rx21 of the reply signal.

At the end of the second time slot 41, that is to say at the end of the first elected time slot, the electronic device 3 which possesses, thanks to the slot map, information about the non-election of the next time slot, here the third time slot 42, start to operates in the first configuration, that is, it deactivate the receiving circuit 30. Therefore, during the third time slot 42, the receiving circuit 30 will consume no current and the electronic device 3 will therefore consume a low current, for instance a current inferior to 5 milliamperes.

During the third time slot 42, which is a non-elected time slot, no reply signal is sent. In alternative, the array 2 may be configured to send a reply signal despite the electronic device being in the first configuration. In this alternative, the third reply signal would not be received.

The electronic device 3 then switches into the second configuration, that is to say activate the receiving circuit 30, for the next elected time slot, here the fourth time slot 43, according to the previously received time slots map and perform a second reply listening LS22. The third anchor 23 performs a second emission PS2 of a second reply signal; in the present example, said second reply signal does not contain the time slots map since it has already been sent to the electronic device 3 during the second time slot 41. Upon detection of the second reply signal, the electronic device 3 performs a second reply reception RX22 of the second reply signal.

Then, according to the time slots map and in a similar way to what has been previously described, the electronic device operate in the first configuration for the next non allocated time slots, here the fifth and sixth time slot 44 and 45 and switches into the second configuration for next elected time slot, here the seventh time slot 46, during which the sixth anchor performs a third emission PS3 of a third reply signal and the electronic device 3 performs a third reply listening LS23 and a third reply reception Rx3 of the third reply signal.

Therefore, thanks to this method, a very low current is consumed during the non-elected time slots.

During the final phase P3, here during the eighth time slot 47, the electronic device 3 performs the final broadcasting RB of the final signal, said final signal comprising in this embodiment information on when the first, second and third reply signals have been received by the electronic device 3.

The final signal may be received by any anchor of the array 2. Therefore, during the final phase, each anchor, respectively 21 to 26, performs a final listening, respectively LS31 to LS36, of the final signal. In this embodiment, all the anchors detect and perform a final reception, respectively RX31, RX32, RX33, RX 34, RX35, RX36 the final signal.

Based on the time information contained in the final signal, each anchor is able to perform a calculation CL to determine distance between itself and the electronic device 3, and to transmit the result of the calculation, that is to say the distance value, to the central unit 20 so the central unit 20 can determine a location of the electronic device 3, for instance by trilateration.

In alternative, the electronic device 3 may be configured to perform the calculation CL, to determine its location and to send its location in the final signal during the final broadcasting RB.

Although only one communication cycle 4 is shown on FIG. 3, the locating process according to the invention may comprise a plurality of cycle, in order to increase the precision of the locating and/or to follow movements of the electronic device 3. Moreover, the elected anchors may of course be different from a cycle to another.

Figure 4:
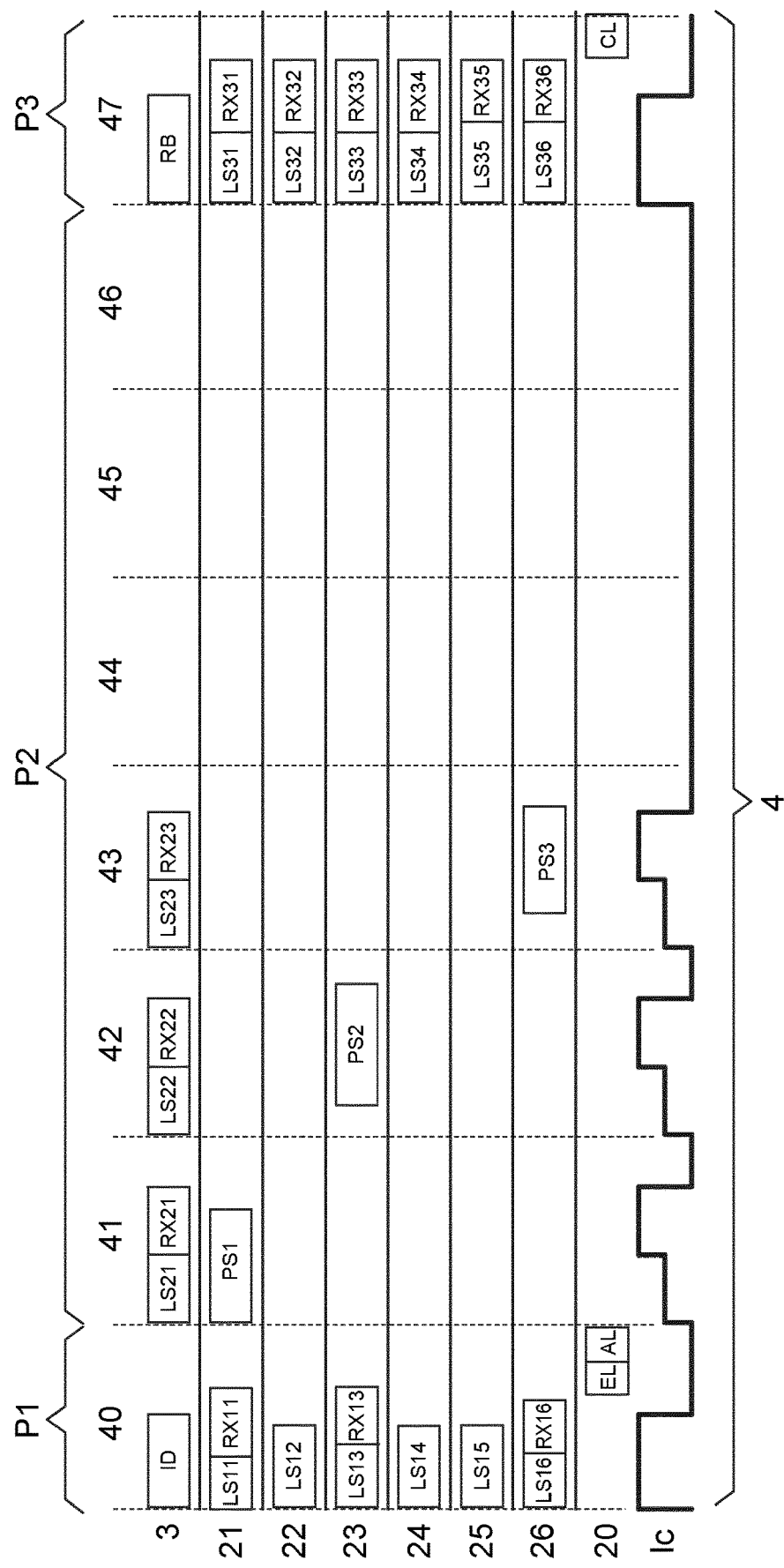
FIG. 4 is a chronogram illustrating a method according to a second embodiment of the invention.

FIG. 4 shows another embodiment of the invention, according to which no slot map is sent to the electronic device 3.

In this embodiment, the election EL comprises an election of the earliest time slots of the reply phase P2, that is to say the second time slot 41, the third time slot 42 and the fourth time slot 43.

In this embodiment, the central unit performs a modification AL of the allocation of the time slots and allocates the second time slot 41, the third time slot 42 and the fourth time slot 43 respectively to the first anchor 21, the third anchor 23 and the sixth anchor 26.

In this embodiment, the three anchors 21, 23 and 26 are preliminary elected by the central unit 20 based on their respective reception status.

During the second, third and fourth time slots 41, 42 and 43, the anchors perform respectively the first emission PS1 of the first reply signal, the second emission PS2 of the second reply signal and the third emission PS3 of the third reply signal, and during each of these time slot, the electronic device (3) which operates in the second configuration, performs the corresponding reply listenings LS21, LS22, LS23 and the corresponding reply receptions RX21, RX22, and RX23.

During the latest elected time slot, here during the fourth time slot 43, the last anchor, here the sixth anchor 26, performs the third emission PS3, or last emission, of the third reply signal, or here the last reply signal, said last reply signal comprising a deactivation command.

The electronic device 3 of this embodiment is configured, in response to the deactivation command, to operate in the first configuration until the end of the reply phase P2, and to switch back to the second configuration for the final phase, that is to say for the eighth time slot 47.

For instance, here, the electronic device 3 is configured to switch to the second configuration after a time period corresponding to the sum of the lengths of the non-elected time slots.

Therefore, a very low current is consumed during the non-elected time slots.

The final phase P3 of this embodiment is carried out in a similar way to that described above with reference to FIG. 3.

Another embodiment is illustrated on FIG. 5.

The method according to this embodiment does not comprise an election of time slots.

In this embodiment, the three anchors 21, 23 and 26 are preliminary elected by the central unit 20 based on the quality of the initiation signal received by each anchor, and only the preliminary elected anchor will send a reply signal.

In this embodiment, the central unit changes the allocation of the time slots and allocate the earliest time slots of the reply phase P2, here second time slot 41, the third time slot 42 and the fourth time slot 43 respectively to the preliminary elected anchor, here the first anchor 21, the third anchor 23 and the sixth anchor 26.

In this embodiment, the electronic device 3 is configured to operate in the first configuration until the final phase P3 if no reply signal is detected after the second predetermined time period during a time slot.

For instance in this embodiment, during the fifth time slot 44, which is not allocated to a preliminary elected anchor, the electronic device which operates in the second configuration performs a fourth reply listening LS24 in which it waits for a detection of a reply signal during the predetermined time period and then switch to the first configuration because no reply signal is detected.

The electronic device 3 switch back to the second configuration for the final phase P3, which is carried out in a similar way to that described above with reference to FIG. 3, and the central unit performs a calculation CL for determining the location of the electronic device 3.

Therefore, the reply phase is simplified because no command is sent to the electronic device via the reply signal.

The invention is not limited to the embodiments described above, and although embodiment in which the array comprises six anchors have been described, the array may comprise any number of anchors and consequently, the reply phase P2 may comprise any number of time slots.

The invention claimed is:

1. A method for locating an electronic device in the vicinity of an array comprising a central unit and a plurality of anchors connected to the central unit, the electronic device comprising a receiving circuit and having a first configuration in which the receiving circuit is deactivated and a second configuration in which the receiving circuit is configured to detect and receive signals, said method being applied during at least a communication cycle comprising a plurality of time slots each allocated to a distinct anchor, the method comprising:

receiving, by at least one of the anchors, of an initiation signal from the electronic device;

performing an election of a set of at least one anchor among the plurality of anchors based on the reception quality of the initiation signal;

emitting the elected set of at least one anchor a reply signal during their respective allocated time slot;

operating the electronic device in the first configuration during the one or several time slots of the communication cycle which are not allocated to one of the anchors belonging to the elected set of at least one anchor such that the electronic device is in a low power operation mode and not actively listening for a reply signal;

operating the electronic device in the second configuration during the at least one time slot allocated to the elected set of at least one anchor in order to detect and receive the reply signal; and calculating of a location of the electronic device based on the reply signal received by the electronic device.

2. The method according to claim 1, comprising an election of some of the time slots of the plurality of time slots and, during the earliest time slot of the plurality of time slots, comprising:

an operation of the electronic device in the second configuration, a first emission by a first anchor, of a first reply signal comprising a time slots map comprising information on which time slots are elected, an operation of the electronic device into the first configuration during the non-elected time slots according to the time slots map, and an operation of the electronic device into the second configuration during the elected time slots according to the time slots map.

3. The method according to claim 1, wherein the emissions comprise a last emission, by a last anchor, of a last reply signal comprising a deactivation command, the method further comprising an operation of the electronic device into the first configuration at the detection of the deactivation command.

4. The method according to claim 1, further comprising an operation of the electronic device in the first configuration if, after a predetermined time period during a time slot, no reply signal is detected by the electronic device in the second configuration.

5. The method according to claim 1, further comprising a plurality of communication cycles.

6. A system comprising:

an electronic device; and an array comprising a central unit and a plurality of anchors electrically coupled to the central unit, the electronic device comprising a receiving circuit and having a first configuration in which the receiving circuit is deactivated and a second configuration in which the receiving circuit is configured to detect and receive signals, the array being configured to locate the electronic device during a communication cycle comprising a plurality of time slots each being allocated to an anchor, wherein the central unit is configured to perform an election of set of at least one anchor among the plurality of anchors based on the reception quality of an initiation signal received from the electronic device by at least one of the anchors, control emissions via the anchors belonging to the elected set of at least one anchor during their respective time slots, of respective reply signals, wherein the electronic device is configured to operate in the first configuration during the one or several time slots of the communication cycle which are not allocated to one of anchors belonging to the elected set of at least one anchor, such that the electronic device is in a low power operation mode and not actively listening for a reply signal, and to operate in the second configuration during the at least one time slot allocated to the elected set of at least one anchor in order to detect and receive the reply signal, the system being configured to calculate a location of the electronic device based on the at least one reply signal received by the electronic device.

7. The system according to claim 6, wherein the array is configured to elect some of the time slots of the plurality of time slots and wherein, the electronic device is configured to be in the second configuration during the earliest time slot of the plurality of time slots, the array is configured to perform a first emission, via a first anchor, of a first reply signal comprising a time slots map comprising information on which time slots are elected, wherein the electronic device is configured to operate in the first configuration during the non-elected time slots and to operate in the second configuration during the elected time slots according to the time slots map.

8. The system according to claim 6, wherein the array is configured to perform a last emission, by a last anchor, of a last reply signal comprising a deactivation command, the electronic device being configured to operate in the first configuration at the detection of the deactivation command.

9. The system according to claim 6, wherein the electronic device is configured to operate in the first configuration if, after a predetermined time period during a time slot, no reply signal is detected by the electronic device operating in the second configuration.

10. An electronic system comprising:

an electronic device comprising a receiving circuit and having a first configuration in which the receiving circuit is deactivated and a second configuration in which the receiving circuit is configured to detect and receive signals, wherein the electronic device is configured to cooperate with and to be located by an array comprising a central unit and a plurality of anchors electrically coupled to the central unit during a communication cycle comprising a plurality of time slots each being allocated to an anchor, the central unit being configured to perform an election of a set of at least one anchor among said plurality of anchors based on the reception quality of an initiation signal received by at least one of the anchors and to control emissions via the elected set of at least one anchor during their respective time slots of respective reply signals, said electronic device being further configured to operate in the first configuration during the one or several time slots of the communication cycle which are not allocated to one of anchors belonging to the elected set of at least one anchor such that the electronic device is in a low power operation mode and not actively listening for a reply signal, and to operate in the second configuration during the at least one time slot allocated to the elected set of at least one anchor in order to detect and receive the reply signal.

11. The electronic system according to claim 10, configured to operate in the second configuration during the earliest time slot of the plurality of time slots, to perform a first reception of a first reply signal comprising a time slots map comprising information regarding an election of some of the time slots by the array, and to operate in the first configuration during the non-elected time slots and to operate in the first configuration during the elected time slots, according to the time slots map.

12. The electronic system according to claim 10, configured to operate in the first configuration at the detection of a deactivation command.

13. The electronic system according to claim 10, configured to operate in the first configuration if, after a predetermined time period operating in the second configuration during a time slot, no reply signal is detected.

14. The method according to claim 1, wherein the plurality of time slots are each allocated based on a time slots map comprising information on which time slots are elected.

15. The system according to claim 6, wherein the system is configured to operate in the first and second configurations based on a time slots map comprising information on which time slots are elected.

16. The electronic system of claim 10, wherein electronic system is configured to operate in the first and second configurations based on a time slots map comprising information on which time slots are elected.

* * * * *